United States Patent
Kenney et al.

[11] Patent Number: 5,934,508
[45] Date of Patent: Aug. 10, 1999

[54] VARIABLE SPEED PUMP-MOTOR ASSEMBLY FOR FUEL DISPENSING SYSTEM

[75] Inventors: Donald P. Kenney, McFarland, Wis.; David M. Triezenberg, Fort Wayne, Ind.

[73] Assignee: FE Petro Inc., McFarland, Wis.

[21] Appl. No.: 09/086,504

[22] Filed: May 28, 1998

Related U.S. Application Data

[63] Continuation of application No. 08/916,966, Aug. 19, 1997, Pat. No. 5,769,134, which is a continuation of application No. 08/500,709, Jul. 11, 1995, Pat. No. 5,673,732.

[51] Int. Cl.⁶ ........................................... B67D 5/00
[52] U.S. Cl. ............................................. 222/55; 222/63
[58] Field of Search ............................ 141/59, 94, 95, 141/98, 192, 311 A; 222/55, 63; 73/40.5 R

[56] References Cited

U.S. PATENT DOCUMENTS

| | | | |
|---|---|---|---|
| 2,440,981 | 5/1948 | Smith et al. | 103/11 |
| 2,732,103 | 1/1956 | Wright et al. | 222/330 |
| 2,797,846 | 7/1957 | Reed | 222/63 |
| 3,136,924 | 6/1964 | Futral et al. | 317/100 |
| 3,643,635 | 2/1972 | Milam | 123/676 |
| 3,669,081 | 6/1972 | Monpetit | 123/497 |
| 3,699,931 | 10/1972 | Cinquegrani | 123/458 |
| 3,801,889 | 4/1974 | Quinn | 318/481 |
| 3,824,965 | 7/1974 | Clawson | 123/275 |
| 3,922,111 | 11/1975 | Deters | 417/26 |
| 4,021,700 | 5/1977 | Ellis-Anwyl | 361/28 |
| 4,247,260 | 1/1981 | Schonwald et al. | 417/38 |
| 4,329,120 | 5/1982 | Walters | 417/12 |
| 4,462,758 | 7/1984 | Speed | 417/38 |
| 4,511,312 | 4/1985 | Hartwig | 417/45 |
| 4,518,318 | 5/1985 | Jensen et al. | 417/53 |
| 4,532,893 | 8/1985 | Day et al. | 123/41.31 |
| 4,628,236 | 12/1986 | Schaefer | 318/558 |
| 4,686,439 | 8/1987 | Cunningham et al. | 318/335 |
| 4,703,387 | 10/1987 | Miller | 361/79 |
| 4,728,264 | 3/1988 | Tuckey | 417/44 |
| 4,834,624 | 5/1989 | Jensen et al. | 417/370 |
| 5,038,838 | 8/1991 | Bergamini et al. | 141/59 |
| 5,040,577 | 8/1991 | Pope | 141/59 |
| 5,189,904 | 3/1993 | Maresca, Jr. et al. | 73/40.5 R |
| 5,197,859 | 3/1993 | Siff | 417/19 |
| 5,213,142 | 5/1993 | Koch et al. | 141/59 |
| 5,240,380 | 8/1993 | Mabe | 417/73 |

(List continued on next page.)

FOREIGN PATENT DOCUMENTS

| | | |
|---|---|---|
| 226 858 | 7/1987 | European Pat. Off. . |
| 0 390 627 A1 | 3/1990 | European Pat. Off. . |
| 584 713 A1 | 3/1994 | European Pat. Off. . |
| 454321 | 9/1936 | United Kingdom . |
| 1 602 550 | 11/1981 | United Kingdom . |
| 2 091 911 | 8/1982 | United Kingdom . |
| 2 177 523 | 1/1987 | United Kingdom . |
| 2 259 157 | 3/1993 | United Kingdom . |

OTHER PUBLICATIONS

Examination Report dated Jul. 15, 1998, 3 pages.

*Primary Examiner*—J. Casimer Jacyna
*Attorney, Agent, or Firm*—Marshall, O'Toole, Gerstein, Murray & Borun

[57] ABSTRACT

A pumping system for use in a fuel service station including one or more fuel dispensers, a fuel storage tank and conduits connecting the fuel dispensers with the tank. The pumping system comprises a variable speed pump-motor assembly for pumping fuel from the storage tank to the conduit and the dispensers, and a control connected to the pump-motor assembly for holding the fuel pressure in a preset range. Preferably the range is that required for efficient operation of a vapor recovery system, or other requirement by the EPA or by another agency, or by a service station operator. The control includes sensors which respond to the pressure in the conduits leading to the fuel dispensers. The sensors may comprise, for example, a pressure sensor in the conduit, or they may comprise power consumption sensors connected to the electrical power supply for the variable speed pump-motor assembly.

12 Claims, 5 Drawing Sheets

U.S. PATENT DOCUMENTS

| | | | |
|---|---|---|---|
| 5,281,101 | 1/1994 | Bevington | 417/38 |
| 5,332,008 | 7/1994 | Todd et al. | 141/59 |
| 5,408,420 | 4/1995 | Slocum et al. | 73/40.5 R |
| 5,450,883 | 9/1995 | Payne et al. | 141/59 |
| 5,473,497 | 12/1995 | Beatty | 361/23 |
| 5,507,325 | 4/1996 | Finlayson | 141/95 |
| 5,511,956 | 4/1996 | Hasegawa et al. | 417/271 |
| 5,518,371 | 5/1996 | Wellstein et al. | 417/44.9 |
| 5,580,221 | 12/1996 | Triezenberg | 417/44.2 |
| 5,673,732 | 10/1997 | Kenney et al. | 141/59 |

VARIABLE SPEED PUMP-MOTOR ASSEMBLY FOR FUEL DISPENSING SYSTEM

This is a Continuation of U.S. application Ser. No. 08/916,966, filed Aug. 19, 1997, now U.S. Pat. No. 5,769,134 which was a continuation of U.S. application Ser. No. 08/500,709 filed Jul. 11, 1995, now U.S. Pat. No. 5,673,732, which is incorporated by reference herein.

FIELD AND BACKGROUND OF THE INVENTION

This invention relates to pumping systems for service stations which dispense fuel such as gasoline into automotive fuel tanks.

Gasoline service stations normally include a number of fuel dispensers and storage tanks for the fuels. A pump-motor assembly is mounted in each tank and it pumps the fuel to a number of dispensers. Such a pumping system normally also includes controls such as a leak detector (either mechanical or electronic) and fault detectors. The pump-motor assembly is a fixed speed type which is turned on when fuel is to be dispensed, in the absence of a leak or other fault condition.

Automatic leak detectors have come into common use. In recent years vapor recovery systems have also come into use in some areas and, in fact, in some areas they have been mandated. Vapor recovery systems (Stage II) are designed to capture fuel vapor leaving an automotive fuel tank during filling and to conduct the vapor to the fuel storage tank or tanks.

As mentioned above, the prior art pumping systems include a fixed speed pump-motor assembly which is either on or off, and such an arrangement has a number of disadvantages. Each pump-motor assembly supplies fuel to a number of dispensers, and the fuel pressure varies with the number of dispensers in use at a given time. If only one dispenser is in use (nozzle open), the fuel pressure in the supply line typically is about 30–32 psi (pounds per square inch) and the nozzle delivers about 10–14 gpm (gallons per minute). If two dispensers are in use, the pressure at both nozzles drops to about 25–28 psi and the flow from each nozzle is about 8–10 gpm. The pressure and the flow rate drop further as additional nozzles are opened. If the pressure is at the high end of the range during fueling, there may be problems with splash-back and hydraulic hammering. On the other hand, if the pressure is at the low end, the time needed to fill a tank may be excessive.

Further, vapor recovery systems are most efficient when the fuel flow rate is at an intermediate value, and the current dispenser manufacturers state that the flow rate should be between 8–10 gpm. Further, the EPA regulations effective January, 1996 and January, 1998 state that the flow rate is to be less than 10 gpm when dispensing. A high pump pressure and pressure regulator valves could be used to meet this requirement, but pumping systems are different and may require customized equipment and/or adjustments.

Still further, leak detectors are most efficient when the pressure is relatively high, but as pointed out above, a high fuel pressure can produce other problems.

It is therefore an object of the present invention to avoid the foregoing disadvantages by providing an improved pumping system including a variable speed pump-motor assembly and controls therefor.

SUMMARY OF THE INVENTION

A pumping system for use in a fuel service station including two or more fuel dispensers, a fuel storage tank and conduits connecting the fuel dispensers with the tank. The pumping system comprises a variable speed pump-motor assembly for pumping fuel from the storage tank to the conduit and the dispensers, and a control connected to the pump-motor assembly for holding the fuel pressure in a preset range during normal operation while fuel is being dispensed. Preferably the range is that required for efficient operation of a vapor recovery system or other EPA requirements. The control includes sensors which respond to the pressure in the conduits leading to the fuel dispensers. The sensors may comprise, for example, a pressure sensor in the conduit, or they may comprise power consumption sensors connected to the electrical power supply for the variable speed pump-motor assembly. A circuit may be provided for producing an initial fuel pressure boost for efficient operation of a leak detector, when the pump-motor assembly is turned on.

BRIEF DESCRIPTION OF THE DRAWINGS

The invention will be better understood from the following detailed description taken in conjunction with the accompanying figures of the drawings, wherein.

DETAILED DESCRIPTION OF THE INVENTION

Figure 1:
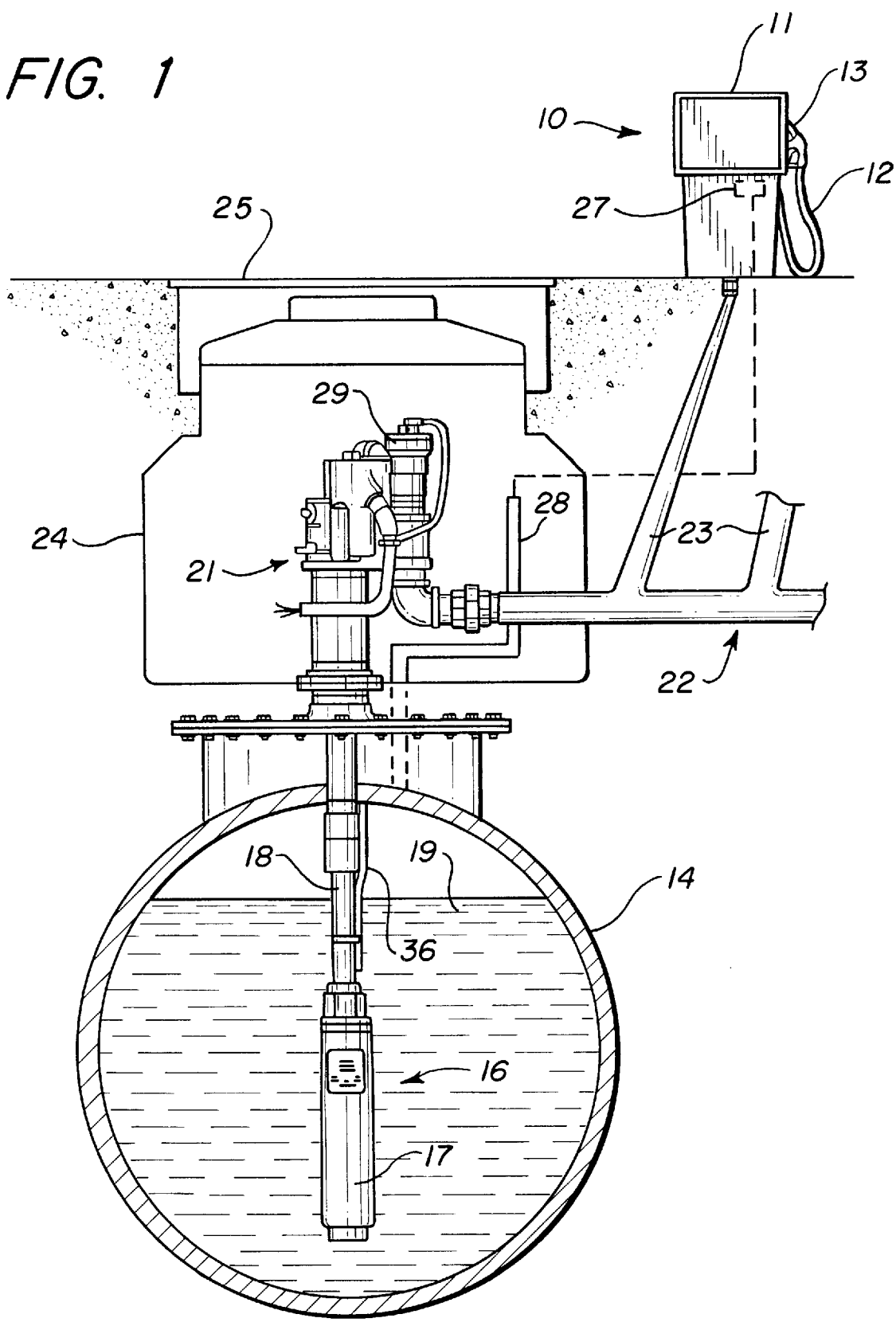
FIG. 1 is a schematic diagram of the pumping system incorporating the invention.

FIG. 1 illustrates a portion of a gasoline service or filling station including a ground level dispenser 10 including a cabinet 11 a dispensing hose 12 and a dispensing nozzle 13. The service station further includes at least one fuel storage tank 14 which, as illustrated in FIG. 1, is usually located below ground surface level. Mounted within the tank 14 is a pump-motor assembly 16. The pump-motor assembly 16 includes a submerged turbine or centrifugal pump driven by an electric motor, the pump and the motor being mounted in a casing 17. The upper end of the assembly 16 is attached to a pipe 18 which both suspends the assembly 16 in the tank 14 and conveys pumped fuel 19. The upper end of the pipe 18 is connected to a manifold assembly 21, the manifold 21 also being connected by conduits 22 and 23 to the dispensers 10. The manifold 21, in this specific example, is mounted in a containment sump 24 which is normally covered by a cover 25 at the street level.

In the embodiment of the invention illustrated in FIG. 1, the system may further include a vapor recovery system including a vapor-pump 27 mounted in the dispenser 10 or near the manifold 21, for example, and a pipe 28 which conveys recovered vapor back to the storage tank 14. The system may still further include a leak detector 29 connected to the conduit 22.

While only one dispenser 10 is illustrated in FIG. 1, it should be understood that the typical service station includes a plurality of dispensers, and a plurality of pipes or conduits 23 lead from the conduit 22 to the various dispensers.

It should also be understood that a typical service station offers a number of grades and/or types of fuel and that each type or grade will have a separate storage tank. Consequently, more than one conduit 23 will lead to each of the dispensers 10.

In the typical operation of the system illustrated in FIG. 1, when a customer picks up the nozzle 13 and inserts it into the fuel tank of an automobile, truck, etc., and activates the dispenser with the dispenser switch, a control circuit turns on the pump-motor assembly 16. The leak detector 29 checks the system for leaks, and assuming there is no leak, fuel is delivered under pressure through the conduits 22 and 23 to the hose 12 and the nozzle 13. If two or more dispensers are operated simultaneously, the assembly 16 delivers fuel under pressure through the conduit 22 to all of the dispensers being operated. It is an important feature of the present invention that the quantity of fuel delivered by the pump-motor assembly 16 varies in accordance with the demand for fuel, the demand, of course, changing as a function of the number of dispensers 10 in use at any given time. The fuel pressure in the conduits 22 and 23 is substantially constant and is independent of the flow demand. The speed of the assembly 16 is adjusted to meet the demand and to hold the pressure substantially constant.

Figure 2:
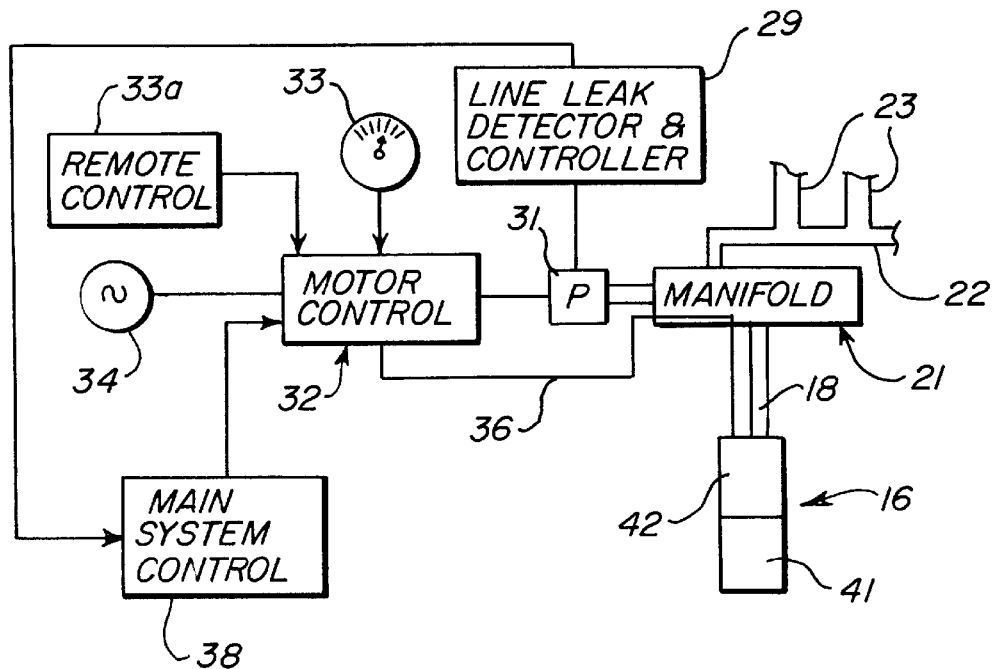
FIG. 2 is a block diagram illustrating an embodiment of the invention.

With reference to FIG. 2, a fuel pressure transducer or sensor 31 is connected to the manifold 21 and senses the fuel pressure in the lines 22 and 23. An electric signal representing the pressure is fed to a motor control and drive module 32 which also receives a set pressure signal from a pressure setting circuit 33. The circuit 32 may also be controlled entirely by a remote control system 33a. Thus the signal from the sensor 31 represents the actual system fuel pressure and the signal from the sensor 33 represents the desired fuel pressure. The module 32 also receives AC power from a source 34 and it is connected to the pump-motor assembly 16 by a cable or power supply line 36.

The system shown in FIG. 2 further includes the leak detector 29 which may be a mechanical or an electronic type. While a variety of arrangements are available for use, in the specific example shown in FIG. 2, an electronic leak detector 29 responds to the line pressure signal provided by the sensor 31, and its output is connected to the main system control 38, which may be in the console of the service station. The main control 38 or a leak detector controller is connected to the motor control 32 and shuts off electric power to the motor in the event of a leak. If a mechanical leak detector is provided, there may be no need for a pressure sensor or for a leak detector controller.

Figure 3:
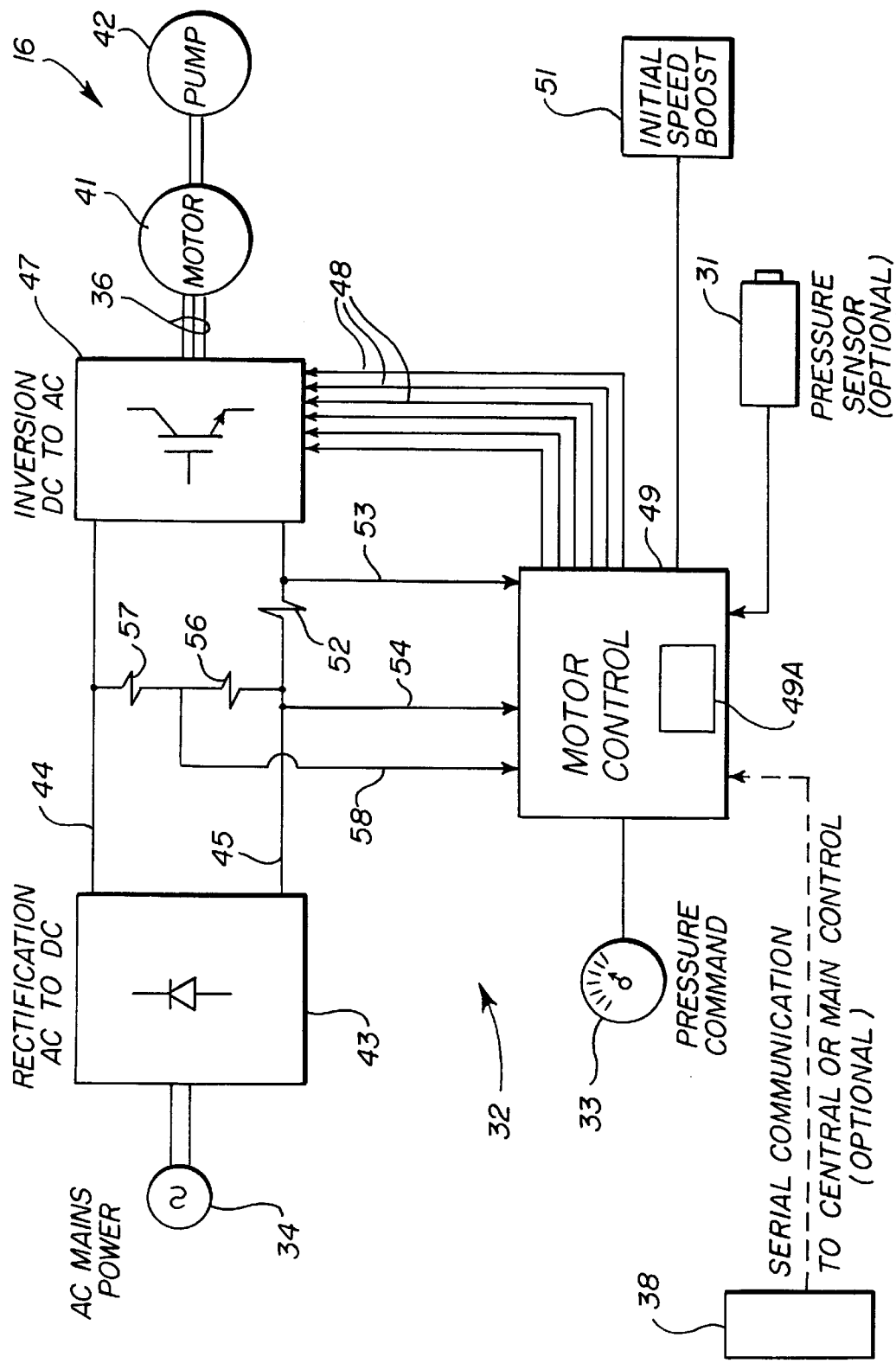
FIG. 3 is a schematic diagram illustrating the embodiment of the invention shown in FIG. 2.

While a variety of well known prior art variable speed motors and electrical drives may be used, it is preferred that a DC link arrangement, having a construction well known to those skilled in the electric motor art, be provided as illustrated in FIG. 3. The pump-motor assembly 16 includes a submersible three-phase induction motor 41 connected by a mechanical coupling to a centrifugal or turbine-type fuel pump 42. The power supply 34 may be a single phase or three phase supply, at either 50 or 60 Hz. The supply is preferably between 200–250 volts AC, but other power supplies may be used. A converter 43 changes the AC voltage to a DC voltage on two lines 44 and 45 which are connected to the input of an inverter 47 that changes the DC voltage to three-phase AC in the power line 36. The inverter 47 includes banks of transistor switches, and control lines 48 carry pulse trains from a control unit 49 to the transistors for switching the transistors on and off to produce a three-phase supply for driving the motor 41.

The control unit 32 is responsive to the signal from the pressure sensor 31 which represents the pressure in the conduits 23, and the unit 32 controls the speed of the pump-motor assembly 16 to maintain the conduit pressure at a substantially constant value regardless of the flow rate of the fuel flowing in the lines 23 leading from the manifold 21 to the dispensers. The flow volume may vary, of course, because the flow in each of the lines 23 may change and the number of dispensers simultaneously in use may change. If the speed of the pump-motor assembly 16 were constant, the pressure would fall with an increase in the number of dispensers in use. However, in accordance with the present invention, the motor control assembly responds to a change in pressure and/or the flow demand in the manifold 21 and changes the speed of the pump-motor assembly 16 to hold the fuel pressure at a substantially constant level regardless of the demand. While the foregoing statement is true for the most part, the control unit 49 preferably includes a limiting circuit which prevents the motor speed from rising above a safe upper limit. Further, as will be described hereinafter, the system preferably further includes a circuit 51 (FIG. 3) for producing an initial pressure boost in the manifold at the time a mechanical leak detector is operating.

The control module 32 may respond to the pressure sensor 31 and include a pressure control circuit as described in the David M. Triezenberg pending patent application Ser. No. 08/318,232 and titled MOTOR CONTROL CIRCUIT now U.S. Pat. No. 5,580,221. The disclosure of application Ser. No. 08/318,232 is incorporated herein by reference.

Instead, the control module 32 may respond to the power supplied to the pump-motor assembly 16. A small size resistor 52 (FIG. 3) is connected in the DC line 45 and two leads 53 and 54 are connected across the resistor 52 and to the control unit 49. The voltage across the resistor 52, of course, is representative of the DC current in the lines 44 and 45. Further, a voltage divider formed by two resistors 56 and 57 is connected across the lines 44 and 45. Two leads 54 and 58 are connected across the resistor 56 and to the unit 49, and the voltage across the lines 54 and 58 is representative of the voltage across the lines 44 and 45. Thus the resistors 52, 56 and 57, and the leads 53, 54 and 58 form current and voltage sensors from which the power drawn by the pump-motor assembly 16 may be represented.

Figure 4:
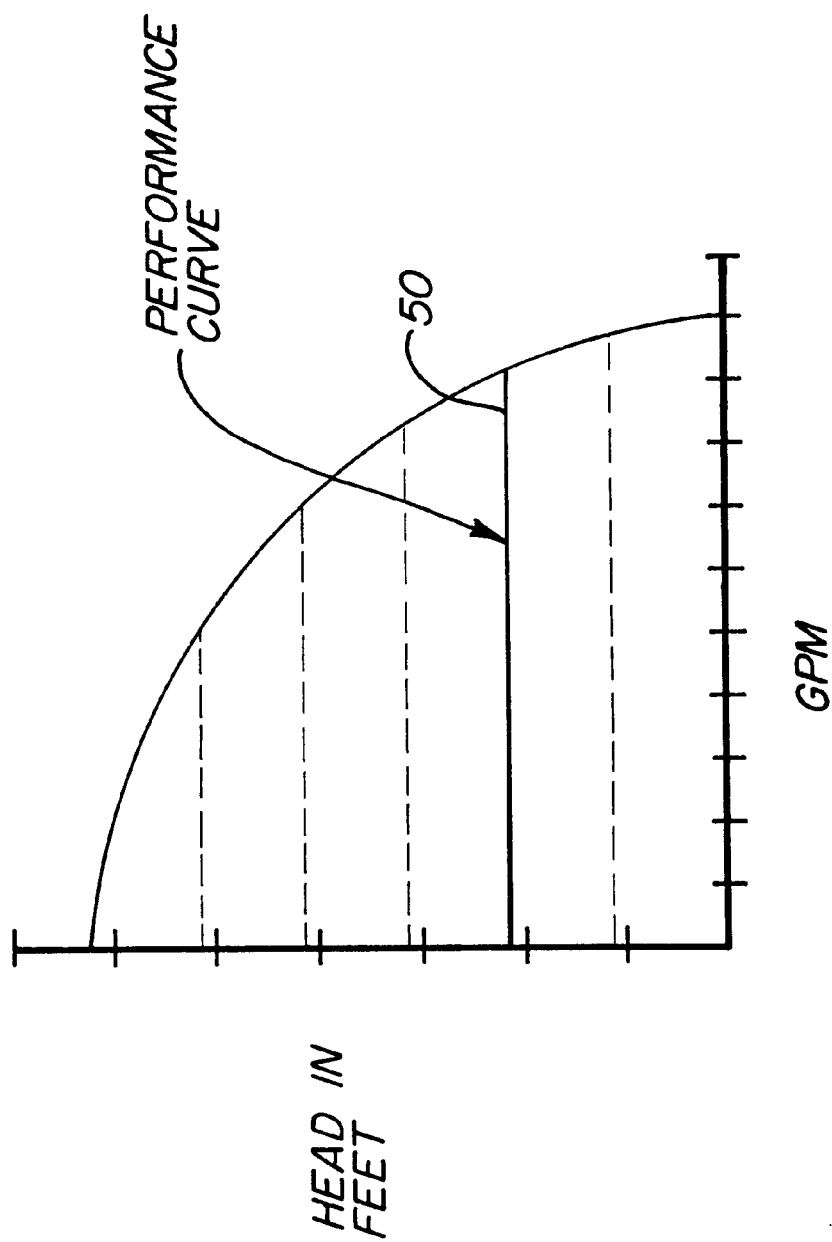
FIG. 4 is a curve illustrating the operation of the apparatus.

For a given design of a pump-motor assembly 16 operating with a known (or negligible) elevation head, the power consumption (from the lines 53, 54 and 58) and the motor speed (from the switching frequency on the lines 48) may be determined by tests for all combinations of pump outlet pressure and flow volume. A constant output pressure under varying flow demand may be attained by adjusting the frequency (the motor speed) up or down as needed to maintain the correct relation of frequency and power consumption. FIG. 4 illustrates a constant pressure performance curve 50 for such a control unit and pump-motor unit. Thus the speed-flow-pressure-watt characteristics are mapped out for a given pump-motor drive unit in a given installation, and these characteristics are then used to infer the pump outlet pressure and flow volume from known (mapped out) motor speed and power consumption. The micro-controller 49A of the control unit 49 is then programmed to achieve a constant pressure output. Techniques for plotting the characteristics of a pump-motor unit are well known to those skilled in this art.

With reference again to FIG. 1, the system further may include a vapor recovery arrangement which may, for example, be constructed as described in U.S. Pat. No. 5,040,577. In such a system, fuel vapor leaving a fuel tank of a vehicle during filling is returned through the hose 12 and the conduit 28 to the storage tank 14. The recovery of the vapor is most efficiently accomplished when the rate of flow of the fuel into the automotive fuel tank is in the range of approximately 8–10 gpm, and the pressure represented by the curve 50 produces this flow rate. The fuel flow rate at a given installation is a function of the line pressure, the nozzle 13 configuration, piping, etc. It is an important feature of the present invention that a flow rate in the 8–10 gpm range, at a given service station may be achieved by adjusting the system for the line pressure which produces the flow rate. Since the line pressure is held substantially constant as shown by the curve 50, this flow rate will then be maintained at all dispensers by automatically adjusting the pump speed and output as needed. The system pressure is adjusted by manually adjusting the pressure command 33.

Summarizing the operation of the system described above, if a mechanical leak detector 29 (which may have a conventional construction) is included in the system, the fuel conduits 23 are tested for a leak each time the pump-motor assembly 16 is turned on (and the fuel pressure in the conduits 23 is below 1–5 psi). The test for a leak takes place within the initial 2 to 6 seconds of operation of the assembly 16. Assuming the conduit pressure is initially below 1–5 psi, the assembly 16 is turned on when fuel is to be dispensed and fuel pressure in the conduits 23 builds up to between 12 and 18 psi. The mechanical leak detector restricts the flow of fuel to the conduits 22 to less than 3 gallons per hour. If the mechanical leak detector does not sense a leak, it opens to the full flow position and fuel may then be dispensed from the dispenser(s).

In a system without the boost circuit 51, when the controller 32 and 33 are set to maintain the conduit pressure at less than approximately 35 psi, the mechanical leak detector may take longer than the initial 2 to 6 seconds to operate; if the controller is set to maintain the pressure at less than approximately 15 psi, the mechanical leak detector nay not function properly at all. These problems are overcome in accordance with this invention because the boost circuit 51 is connected to the control 49 to sense the initial energization of the motor 41 and to activate the control 49 to produce an initial boost in motor speed for an initial 2 to 6 seconds. The boost circuit is preferably structured to make possible an adjustment at the point of installation, for the time length of the initial boost, to accommodate different leak detectors and other variables. Following the initial speed boost (and the consequent fuel pressure boost), the fuel pressure level is reset by the control 49 to maintain the pressure as set by the command 33 to maintain the flow rate of 8–10 gpm.

In a system including an electronic line leak detector 29 (FIG. 2), the system operation depends on the particular leak detector in use. In the event that an electronic line leak detector is included in the system, which could utilize the features of the variable speed pump-motor assembly 16 to increase or decrease the conduit pressure, the detector may be connected to the motor controller 32 through a serial connection. This arrangement would enable the detector to turn on or off the motor, or to run the motor to produce higher pressures, or to run the motor to produce different pressures for defined periods of time, or to provide any other function to enable the operation to be more efficient.

Figure 5:
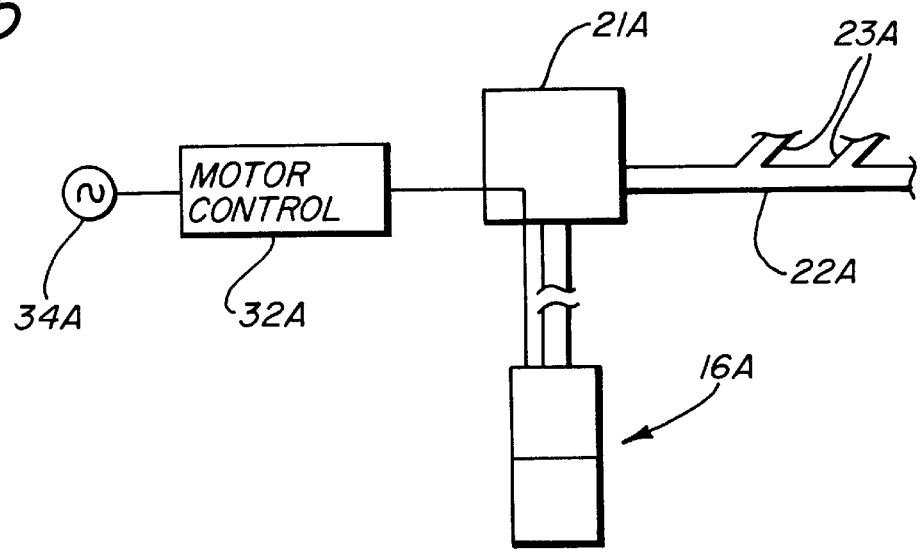

FIG. 5 illustrates a system generally similar to that of FIGS. 1 to 3 but without the remote controls shown in FIG. 3. The motor control 32A includes voltage and current sensors as described above and controls the speed of the assembly 16A as a function of the power delivered to the assembly.

Figure 6:
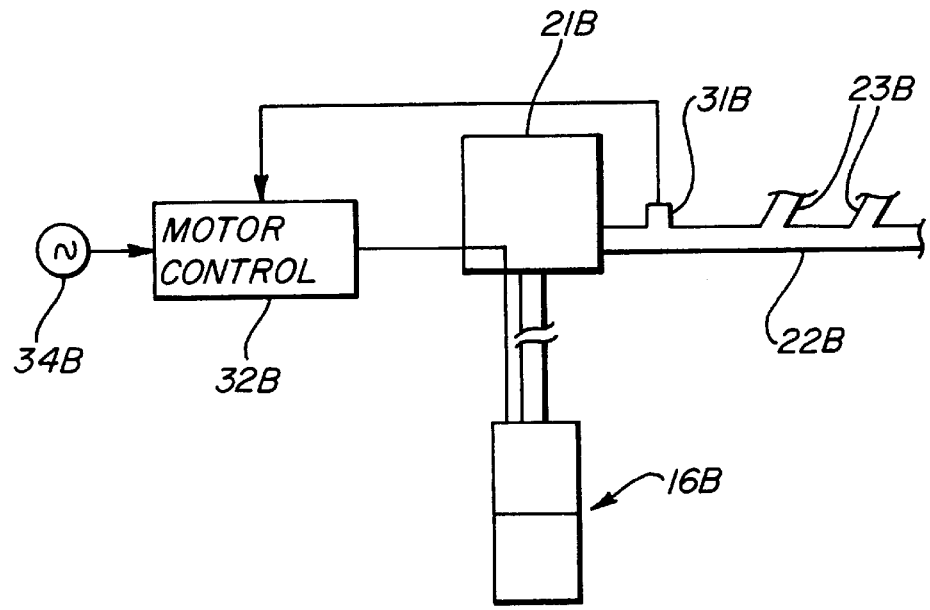

FIG. 6 also illustrates a system generally similar to that of FIGS. 1 to 3 but without the remote controls. The pressure transducer 31B delivers a line pressure representative signal to the control 32B, which controls the motor speed to hold the pressure at a substantially constant level.

Figure 7:
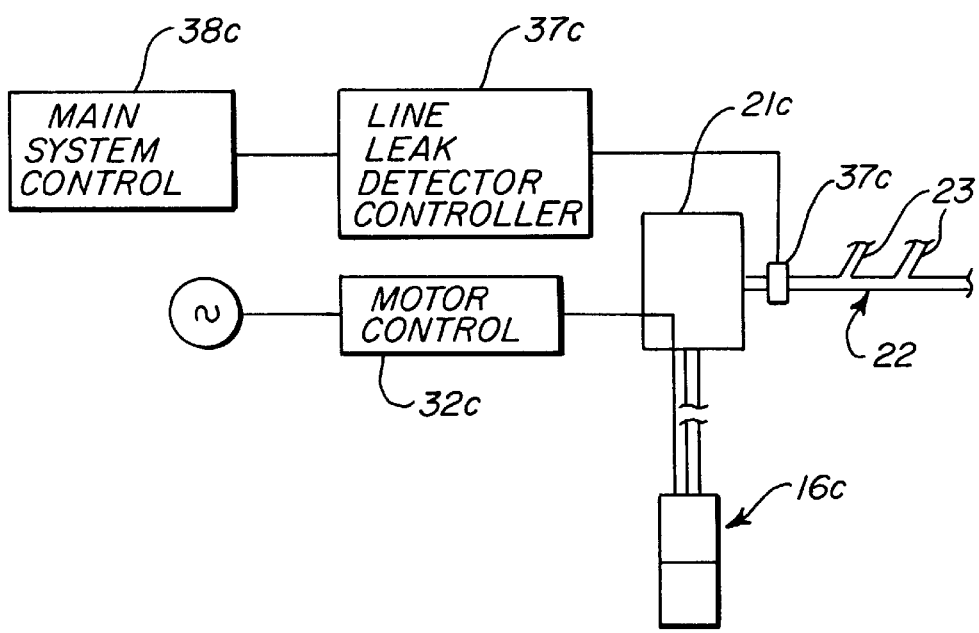
FIGS. 5, 6, and 7 are diagrams similar to FIG. 2 but illustrating additional embodiments of the invention.

Finally, FIG. 7 shows a system similar to that of FIG. 5 but which includes a leak detector 37C. A pressure sensor 37D of the leak detector provides a pressure representative signal during the initial period of operation of the pump-motor assembly 16C. If a leak is detected, the detector 37C shuts down the motor control and drive circuit in the module 32C and it signals the main system control or console 38C.

It will be apparent from the foregoing that a novel and useful pumping system has been provided. The system is operable to provide fuel at a nozzle pressure low enough to provide appropriate and not excessive flow rate to avoid splash back and hydraulic hammering, and at a pressure which is most efficient for operation of a vapor recovery system (Stage II). This pressure is substantially constant at all dispensers regardless of the number of dispensers in use. Further, the system easily accommodates other controls such as a leak detector, and it may include means for increasing the system pressure for a short interval.

A number of factors influence the pressure at a service station, including the size and length of the conduits; the type of dispenser and nozzle; the elevation difference between the supply tank and the nozzle; the type of vapor recovery system; the type of leak detector; and the presence of other components such as mechanical breakaways and swivels. At a given installation, the pumping system may have to be adjusted to achieve the desired pressure in view of the above factors, and adjustment may be made by setting the control 33 (FIG. 2).

What is claimed is:

1. A fuel dispensing system for a service station for motor vehicles, said fuel dispensing system comprising:
   an underground fuel storage tank that stores a quantity of liquid fuel for motor vehicles;
   a plurality of fuel dispensers that deliver said fuel to motor vehicle tanks, each of said fuel dispensers comprising:
      a fuel dispensing hose;
      a nozzle fluidly coupled to said fuel dispensing hose; and
      a switch capable of placing said fuel dispenser in a fuel-dispensing state in which said fuel dispenser dispenses fuel and a non-fuel-dispensing state in which said fuel dispenser is not dispensing fuel, said switch being independently operable;
   an underground fuel flow conduit network that conveys fuel from said underground fuel storage tank to said fuel dispensers;
   a submersible fuel pump assembly that pumps fuel from said underground fuel storage tank through said underground fuel flow conduit network to said fuel dispensers, said submersible fuel pump assembly being located within said underground fuel storage tank and at least a portion of said submersible fuel pump assembly being submerged in said liquid fuel disposed in said underground fuel storage tank, said submersible fuel pump assembly comprising:
      a fuel pump;
      an electric motor operable at an adjustable speed and operatively coupled to drive said fuel pump; and
      a casing in which said fuel pump and said electric motor are disposed;
   a sensor that generates a signal representing a parameter of electrical power drawn by said electric motor;
   a fluid-pressure setting device;

an AC-to-DC converter adapted to be connected to a source of AC power, said AC-to-DC converter generating a DC voltage from said AC power;

a DC-to-AC inverter operatively coupled between said AC-to-DC converter and said electric motor that converts said DC voltage generated by said AC-to-DC converter into an AC voltage having a frequency that may be adjusted; and a controller operatively coupled to said DC-to-AC inverter via a plurality of control lines and being operatively coupled to said fluid-pressure setting device and said sensor, said controller controlling the rate at which fuel is delivered from said underground fuel storage tank to said fuel dispensers, said controller causing the fuel pressure at a point within said underground fuel flow conduit network to be maintained substantially constant so that fuel is delivered from said underground fuel storage tank through said underground fuel flow conduit network to each of said fuel dispensers that is in said fuel-dispensing state at a fuel flow rate of at least approximately eight gallons per minute and not exceeding approximately ten gallons per minute, said controller controlling said adjustable speed of said electric motor in response to said signal generated by said sensor and in response to said fluid pressure set by said fluid-pressure setting device to maintain substantially constant said fuel pressure at said point within said underground fuel flow conduit network.

2. A fuel dispensing system as defined in claim 1 wherein said sensor comprises a current sensor that senses electrical current.

3. A fuel dispensing system as defined in claim 1 wherein said sensor is operatively coupled between said AC-to-DC converter and said DC-to-AC inverter.

4. A fuel dispensing system for a service station for motor vehicles, said fuel dispensing system comprising:

an underground fuel storage tank that stores a quantity of liquid fuel for motor vehicles;

a plurality of fuel dispensers that deliver said fuel to motor vehicle tanks, each of said fuel dispensers comprising:
a fuel dispensing hose;
a nozzle fluidly coupled to said fuel dispensing hose; and
a switch capable of placing said fuel dispenser in a fuel-dispensing state in which said fuel dispenser dispenses fuel and a non-fuel-dispensing state in which said fuel dispenser is not dispensing fuel, said switch being independently operable;

an underground fuel flow conduit network that conveys fuel from said underground fuel storage tank to said fuel dispensers;

a submersible fuel pump assembly that pumps fuel from said underground fuel storage tank through said underground fuel flow conduit network to said fuel dispensers, said submersible fuel pump assembly being located within said underground fuel storage tank and at least a portion of said submersible fuel pump assembly being submerged in said liquid fuel disposed in said underground fuel storage tank, said submersible fuel pump assembly comprising:
a fuel pump; and
an electric motor operable at an adjustable speed and operatively coupled to drive said fuel pump;

a sensor that generates a signal indicative of a parameter of electrical power drawn by said electric motor;

a fluid-pressure setting device;

an AC-to-DC converter adapted to be connected to a source of AC power, said AC-to-DC converter generating a DC voltage from said AC power;

a DC-to-AC inverter operatively coupled between said AC-to-DC converter and said electric motor that converts said DC voltage generated by said AC-to-DC converter into an AC voltage having a frequency that may be adjusted; and a controller operatively coupled to said DC-to-AC inverter via a plurality of control lines and being operatively coupled to said fluid-pressure setting device and said sensor, said controller controlling the rate at which fuel is delivered from said underground fuel storage tank to said fuel dispensers, said controller causing the fuel pressure at a point within said underground fuel flow conduit network to be maintained substantially constant so that fuel is delivered from said underground fuel storage tank through said underground fuel flow conduit network to each of said fuel dispensers that is in said fuel-dispensing state at a fuel flow rate within a predetermined flow rate range, said controller controlling said adjustable speed of said electric motor in response to said signal generated by said sensor and in response to said fluid pressure set by said fluid-pressure setting device to maintain substantially constant said fuel pressure at said point within said underground fuel flow conduit network.

5. A fuel dispensing system as defined in claim 4 wherein said sensor comprises a current sensor that senses electrical current.

6. A fuel dispensing system as defined in claim 4 wherein said sensor is operatively coupled between said AC-to-DC converter and said DC-to-AC inverter.

7. A fuel dispensing system for a service station for motor vehicles, said fuel dispensing system comprising:

an underground fuel storage tank that stores a quantity of liquid fuel for motor vehicles;

a plurality of fuel dispensers that deliver said fuel to motor vehicle tanks, each of said fuel dispensers comprising:
a fuel dispensing hose;
a nozzle fluidly coupled to said fuel dispensing hose; and
a switch capable of placing said fuel dispenser in a fuel-dispensing state in which said fuel dispenser dispenses fuel and a non-fuel-dispensing state in which said fuel dispenser is not dispensing fuel, said switch being independently operable;

an underground fuel flow conduit network that conveys fuel from said underground fuel storage tank to said fuel dispensers;

a submersible fuel pump assembly that pumps fuel from said underground fuel storage tank through said underground fuel flow conduit network to said fuel dispensers, said submersible fuel pump assembly being located within said underground fuel storage tank and at least a portion of said submersible fuel pump assembly being submerged in said liquid fuel disposed in said underground fuel storage tank, said submersible fuel pump assembly comprising:
a fuel pump; and
an electric motor operable at an adjustable speed and operatively coupled to drive said fuel pump;

a sensor that generates a signal representing a parameter of electrical power drawn by said electric motor; and a controller operatively coupled to said sensor, said controller controlling the rate at which fuel is delivered from said underground fuel storage tank to said fuel dispensers, said controller causing the fuel pressure at a point within said underground fuel flow conduit network to be maintained substantially constant so that fuel is delivered from said underground fuel storage tank through said underground fuel flow conduit network to each of said fuel dispensers that is in said fuel-dispensing state at a fuel flow rate within a predetermined flow rate range, said controller controlling said adjustable speed of said electric motor in response to said signal generated by said sensor to maintain substantially constant said fuel pressure at said point within said underground fuel flow conduit network.

8. A fuel dispensing system as defined in claim 7 wherein said sensor comprises a current sensor that senses electrical current.

9. A fuel dispensing system for a service station for motor vehicles, said fuel dispensing system comprising:
   an underground fuel storage tank that stores a quantity of liquid fuel for motor vehicles;
   a plurality of fuel dispensers that deliver said fuel to motor vehicle tanks, each of said fuel dispensers comprising:
      a fuel dispensing hose;
      a nozzle fluidly coupled to said fuel dispensing hose; and
      a switch capable of placing said fuel dispenser in a fuel-dispensing state in which said fuel dispenser dispenses fuel and a non-fuel-dispensing state in which said fuel dispenser is not dispensing fuel, said switch being independently operable;
   an underground fuel flow conduit network that conveys fuel from said underground fuel storage tank to said fuel dispensers;
   a submersible fuel pump assembly that pumps fuel from said underground fuel storage tank through said underground fuel flow conduit network to said fuel dispensers, said submersible fuel pump assembly being located within said underground fuel storage tank and at least a portion of said submersible fuel pump assembly being submerged in said liquid fuel disposed in said underground fuel storage tank, said submersible fuel pump assembly comprising:
      a fuel pump; and
      an electric motor operable at an adjustable speed and operatively coupled to drive said fuel pump;
   a fluid-pressure setting device;
   an AC-to-DC converter adapted to be connected to a source of AC power, said AC-to-DC converter generating a DC voltage from said AC power;
   a DC-to-AC inverter operatively coupled between said AC-to-DC converter and said electric motor that converts said DC voltage generated by said AC-to-DC converter into an AC voltage having a frequency that may be adjusted;
   a sensor that generates a signal representing a parameter of electrical power; and
   a controller operatively coupled to said DC-to-AC inverter via a plurality of control lines and being operatively coupled to said fluid-pressure setting device and said sensor, said controller controlling the rate at which fuel is delivered from said underground fuel storage tank to said fuel dispensers, said controller causing the fuel pressure at a point within said underground fuel flow conduit network to be maintained substantially constant so that fuel is delivered from said underground fuel storage tank through said underground fuel flow conduit network to each of said fuel dispensers that is in said fuel-dispensing state at a fuel flow rate of at least approximately eight gallons per minute and not exceeding approximately ten gallons per minute, said controller being responsive to said signal generated by said sensor in controlling said electric motor.

10. A fuel dispensing system as defined in claim 9 wherein said sensor comprises a current sensor that senses electrical current.

11. A fuel dispensing system as defined in claim 9 wherein said sensor comprises a current sensor operatively coupled between said AC-to-DC converter and said DC-to-AC inverter.

12. A fuel dispensing system for a service station for motor vehicles, said fuel dispensing system comprising:
   an underground fuel storage tank that stores a quantity of liquid fuel for motor vehicles;
   a plurality of fuel dispensers that deliver said fuel to motor vehicle tanks, each of said fuel dispensers comprising:
      a fuel dispensing hose;
      a nozzle fluidly coupled to said fuel dispensing hose; and
      a switch capable of placing said fuel dispenser in a fuel-dispensing state in which said fuel dispenser dispenses fuel and a non-fuel-dispensing state in which said fuel dispenser is not dispensing fuel, said switch being independently operable;
   an underground fuel flow conduit network that conveys fuel from said underground fuel storage tank to said fuel dispensers;
   a submersible fuel pump assembly that pumps fuel from said underground fuel storage tank through said underground fuel flow conduit network to said fuel dispensers, said submersible fuel pump assembly being located within said underground fuel storage tank and at least a portion of said submersible fuel pump assembly being submerged in said liquid fuel disposed in said underground fuel storage tank, said submersible fuel pump assembly comprising:
      a fuel pump; and
      an electric motor operable at an adjustable speed and operatively coupled to drive said fuel pump;
   a fluid-pressure setting device;
   an AC-to-DC converter adapted to be connected to a source of AC power, said AC-to-DC converter generating a DC voltage from said AC power;
   a DC-to-AC inverter operatively coupled between said AC-to-DC converter and said electric motor that converts said DC voltage generated by said AC-to-DC converter into an AC voltage having a frequency that may be adjusted;
   a sensor that generates a signal relating to fuel flow within said fuel dispensing system; and
   a controller operatively coupled to said DC-to-AC inverter via a plurality of control lines and being operatively coupled to said fluid-pressure setting device and said sensor, said controller controlling the rate at which fuel is delivered from said underground fuel storage tank to said fuel dispensers, said controller causing the fuel pressure at a point within said underground fuel flow conduit network to be maintained substantially constant so that fuel is delivered from said underground fuel storage tank through said underground fuel flow conduit network to each of said fuel dispensers that is in said fuel-dispensing state at a fuel flow rate within a predetermined flow rate range of between approximately eight gallons per minute and approximately ten gallons per minute, said controller controlling said adjustable speed of said electric motor in response to said signal generated by said sensor to maintain substantially constant said fuel pressure at said point within said underground fuel flow conduit network.

* * * * *